United States Patent [19]

Chan

[11] Patent Number: 5,066,467
[45] Date of Patent: * Nov. 19, 1991

[54] LIQUID DEGASSER IN AN EBULLATED BED PROCESS

[75] Inventor: Ting Y. Chan, Houston, Tex.

[73] Assignee: Texaco Inc., White Plains, N.Y.

[*] Notice: The portion of the term of this patent subsequent to Dec. 12, 2006 has been disclaimed.

[21] Appl. No.: 593,403

[22] Filed: Oct. 5, 1990

[51] Int. Cl.$^5$ .................... B01J 8/22; F27B 15/02; F27B 15/12
[52] U.S. Cl. ................................ 422/140; 55/184; 55/398; 422/147
[58] Field of Search ............ 422/140, 143, 147, 146; 208/143, 146, 147, 148, 157; 55/398, 184

[56] References Cited

U.S. PATENT DOCUMENTS

| | | | |
|---|---|---|---|
| 2,959,534 | 11/1960 | Fogle | 422/143 |
| 4,618,418 | 10/1986 | Heijnen et al. | 422/147 X |
| 4,810,359 | 3/1989 | Sayles | 208/146 X |
| 4,886,644 | 12/1989 | Chan et al. | 422/140 |

Primary Examiner—Robert J. Warden
Assistant Examiner—Amalia L. Santiago
Attorney, Agent, or Firm—Jack H. Park; Kenneth R. Priem; Richard A. Morgan

[57] ABSTRACT

In an ebullated bed reactor it has been found that an improved gas-liquid separator effectively removes gas from recycle liquid used to ebullate the catalyst bed. The gas-liquid separator comprises a cup with a plurality of riser conduits. Two stages of cyclone separators effect the final liquid-vapor separation.

5 Claims, 2 Drawing Sheets

LIQUID DEGASSER IN AN EBULLATED BED PROCESS

CROSS-REFERENCE TO RELATED APPLICATION

The application is related to U.S. Pat. No. 4,971,678 for Liquid Inventory Control in An Ebullated Bed Process to John. C. Strickland

BACKGROUND OF THE INVENTION

1. Field of the Invention

This invention relates to an improved recycle vapor-liquid separator in an ebullated bed process. The separator comprises a cup with a plurality of riser conduits and two stages of cyclone separators.

2. Description of Other Relevant Methods in the Field

The ebullated bed process comprises the passing of concurrently flowing streams of liquids or slurries of liquids and solids and gas through a vertically cylindrical vessel containing catalyst. The catalyst is placed in random motion in the liquid and has a gross volume dispersed through the liquid medium greater than the volume of the mass when stationary. This technology has found commercial application in the upgrading of heavy liquid hydrocarbons or converting coal to synthetic oils. The process is generally described in U.S. Pat. No. 25,770 to Johanson incorporated herein by reference. A mixture of hydrocarbon liquid and hydrogen is passed upwardly through a bed of catalyst particles at a rate such that the particles are forced into random motion as the liquid and gas pass upwardly through the bed. The catalyst bed motion is controlled by a recycle liquid flow so that at steady state, the bulk of the catalyst does not rise above a definable level in the reactor. Vapors along with the liquid which is being hydrogenated pass through the upper level of catalyst particles into a substantially catalyst free zone and are removed at the upper portion of the reactor.

In an ebullated bed process the substantial amounts of hydrogen gas and light hydrocarbon vapors present rise through the reaction zone into the catalyst free zone. Liquid is both recycled to the bottom of the reactor and removed from the reactor as product from this catalyst free zone. Vapor is separated from the liquid recycle stream before being passed through the recycle conduit to the recycle pump suction. The recycle pump (ebullation pump) maintains the expansion (ebullation) and random motion of catalyst particles at a constant and stable level. Gases or vapors present in the recycled liquid materially decrease the capacity of the recycle pump as well as reduce the liquid residence time in the reactor and limit hydrogen partial pressure.

Reactors employed in a catalytic hydrogenation process with an ebullated bed of catalyst particles are designed with a central vertical recycle conduit which serves as the downcomer for recycling liquid from the catalyst free zone above the ebullated catalyst bed to the suction of a recycle pump to recirculate the liquid through the catalytic reaction zone. The recycling of liquid from the upper portion of the reactor serves to ebullate the catalyst bed, maintain temperature uniformity through the reactor and stabilize the catalyst bed.

U.S. Pat. No. 4,221,653 to Chervenak et al. describes an apparatus for separating vapor from liquid in an ebullated bed process. The apparatus comprises a frusto-conical cup in which are inserted a plurality of riser conduits. The conduits are positioned in two concentric circles within the cup. The generic term for the recycle gas-liquid separator apparatus in an ebullating bed process is a recycle cup. The recycle cup of the Chervenak et al. patent and those like it with a plurality of riser conduits are referred to as a tubular recycle cup.

It is a critical feature of the recycle cup that the upflowing liquid-gas mixture rising from the reaction zone passes through the riser conduits of the separation apparatus and that lower ends of all conduits are below the reactor liquid level. After passage through the recycle cup, the gas portion rises to the top of the reactor. Part of the liquid portion is returned through a downcomer conduit and recycled to the reaction zone. The remaining liquid portion is withdrawn from the reactor as liquid product. The returned liquid portion passes through the recycle conduit to a recycle pump, then passes through a liquid-gas distribution means, together with fresh liquid and hydrogen feed to maintain uniform upward fluid flow through the ebullated catalyst bed. The liquid and vapor effluent may be withdrawn separately from the upper portion of the reactor. If withdrawn separately, a second interface between liquid and vapor is established. Vapor is withdrawn from above the interface. The liquid is withdrawn from a point in the reactor free of vapor. If desired, liquid and vapor portions may be withdrawn together through a single conduit extending into the reactor to a position adjacent the separator apparatus.

U.S. Pat. No. 4,151,073 to A. G. Comolli and U.S. Pat. No. 4,354,852 to P. H. Kydd recognize the advantages of effecting the recycle liquid-vapor separation in an ebullated bed process by feeding the fluid tangentially to a cylindrical separator. By this method, the hot fluid is fed to the cylindrical separator at conditions to prevent carbonaceous particulate material from depositing on the interior surface of the separator. These conditions include tangential injection of feed to the separator, fluid temperature of 550° F. to 900° F. and a separator length/diameter ratio of 20/1 to 50/1. The Kydd patent additionally teaches that a liquid vortex in the cylindrical separator reduces coke deposition.

The design of liquid cyclone separators is well known in the art. For example, U.S. Pat. Nos. 3,668,116 and 4,012,314 describe the use of a liquid cyclone in an ebullated bed process. An essential feature of any cyclone is tangential feed to a circumferential wall.

U.S. Pat. No. 4,886,644 to T. Y. Chan et al. teaches a liquid degasser in an ebullated bed process. The degasser comprises a cup with a plurality or riser conduits. Helical members are positioned in the riser conduits and cyclone separators in fluid communication therewith.

DETAILED DESCRIPTION OF THE DRAWINGS

In order to demonstrate and provide a better understanding of the invention, reference is made to the drawings.

Figure 1:
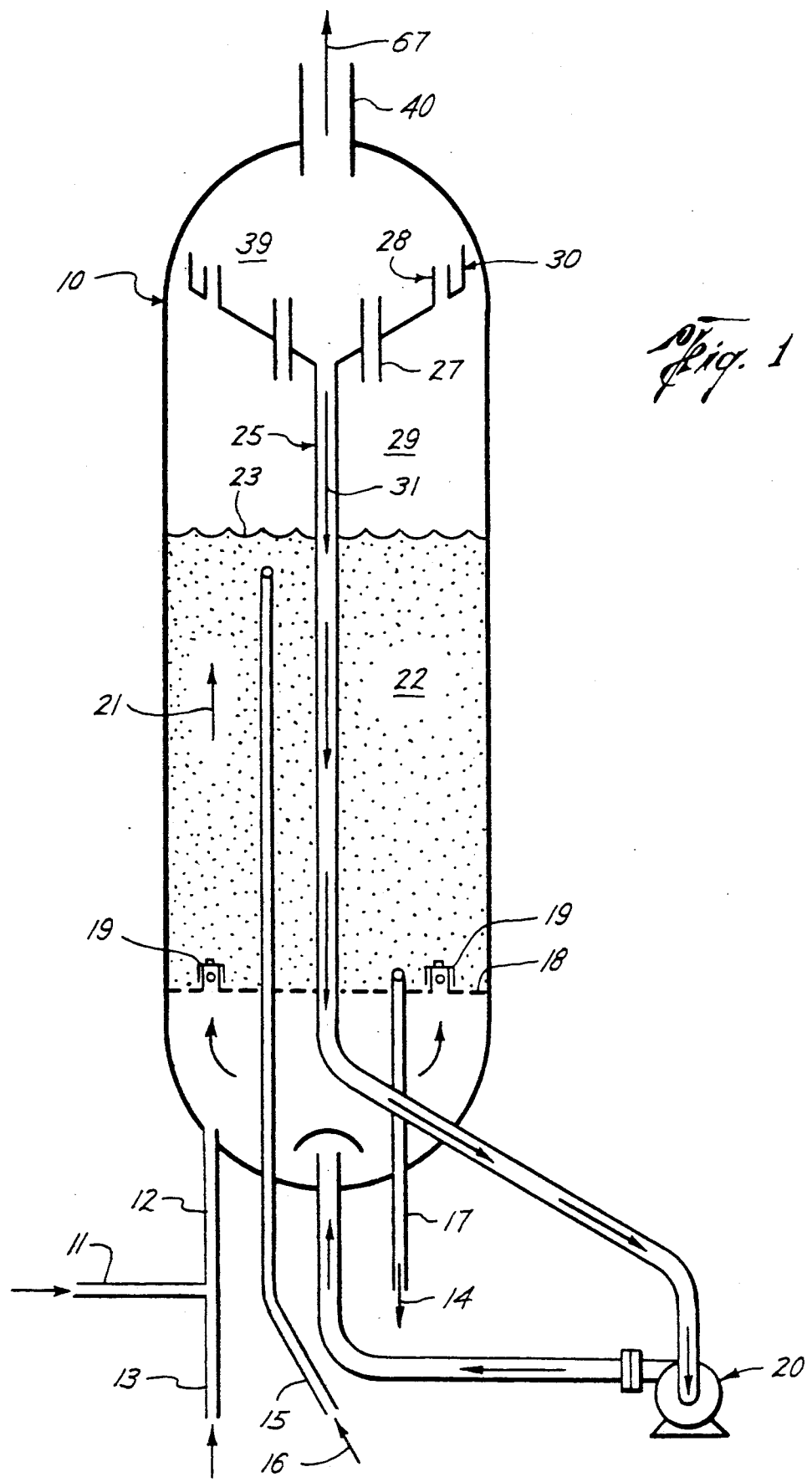
FIG. 1 is a sectional elevated view of a reaction vessel containing a tubular recycle cup vapor-liquid separation apparatus.

The invention is further illustrated by reference to FIG. 1. Reaction vessel 10 is positioned with its long axis in a vertical position and is generally of a circular cross section. Although this FIG. 1 drawing is schematic in order to show its various features, it will be understood that the reactor is constructed in such a fashion and from such materials that it is suitable for reacting liquids, liquid-solid slurries, solids and gases at elevated temperatures and pressures and in a preferred embodiment for treating hydrocarbon liquids with hydrogen at high pressures and high temperatures, e.g. 100 to 5000 psi and 300° F. to 1500° F. The reactor 10 is fitted with a suitable inlet conduit 12 for feeding heavy oil and a hydrogen-containing gas. Outlet conduits are located in the upper portion of reactor 10; outlet conduit 40 designed to withdraw vapor and liquid. The reactor also contains means for introducing and withdrawing catalyst particles, which are shown schematically as conduit 15 through which fresh catalyst 16 is flowed and conduit 17 through which spent catalyst 14 is withdrawn.

Heavy oil feedstock is introduced through conduit 11, while hydrogen-containing gas is introduced through conduit 13, and may be combined with the feedstock and fed into reactor 10 through conduit 12 in the bottom of the reactor. The incoming fluid passes through grid tray 18 containing suitable fluid distribution means. In this drawing, bubble caps 19 are shown as the fluid distribution means, but it is to be understood that any suitable device known in the art which will uniformly distribute the fluid coming from conduit 12 over the entire cross-sectional area of reactor 10 may be utilized.

The mixture of liquid and gas flows upwardly, and the catalyst particles are thereby forced into an ebullated movement by the gas flow and the liquid flow delivered by recycle pump 20 (ebullation pump) which may be either internal or external to the reactor 10. The upward liquid flow delivered by this recycle pump 20 is sufficient to cause the mass of catalyst particles in catalytic reaction zone 22 (catalyst bed) to expand by at least 10% and usually by 20 to 200% over the static volume, thus permitting gas and liquid flow as shown by direction arrow 21 through reactor 10. Due to the upwardly directed flow provided by the pump and the downward forces provided by gravity, the catalyst bed particles reach an upward level of travel or ebullation while the lighter liquid and gas continue to move upward beyond that level. In this drawing, the upper level of catalyst or catalyst-liquid interface is shown as interface 23, and the catalytic reaction zone 22 extends from grid tray 18 to level 23. Catalyst particles in catalytic reaction zone 22 move randomly and are uniformly distributed through the entire zone in reactor 10.

At steady state, few catalyst particles rise above catalyst-liquid interface 23. The catalyst depleted zone 29, above the interface 23, is filled with liquid and entrained gas or vapor. Gas and vapor are separated from liquid in the recycle cup 30 to collect and recycle a liquid with a substantially reduced gas and vapor content through recycle conduit 25 of generally circular cross-sectional area. Gases, vapors, and liquids are withdrawn together through conduit 40. It is desirable that all gas be removed from the reaction vessel preferential to remove liquid to maintain material balance as taught by U.S. Pat. No. 4,971,678 for Liquid Inventory Control In An Ebullated Bed Process to John C. Strickland incorporated herein by reference.

The enlarged upper end of recycle conduit 25 is the recycle cup 30. A plurality of vertically directed riser conduits 27 and 28 provides fluid communication between catalyst depleted zone 29 and phase separation zone 39. Gas-entrained liquid moves upwardly through the riser conduits 27 and 28, and upon leaving the upper ends of these riser conduits, a portion of the fluid reverses direction and flows downward through recycle conduit 25 in the direction of arrow 31 to the inlet of recycle pump 20 and thereby is thereby recycled to the lower portion of reactor 10 below grid tray 18. Gases and vapors which are separated from the liquid, rise to collect in the upper portion of reactor 10 and are removed through reactor outlet conduit 40. The gases and vapors removed at this point are treated using conventional means to recover as much hydrogen as possible for recycle to conduit 13.

Figure 2:
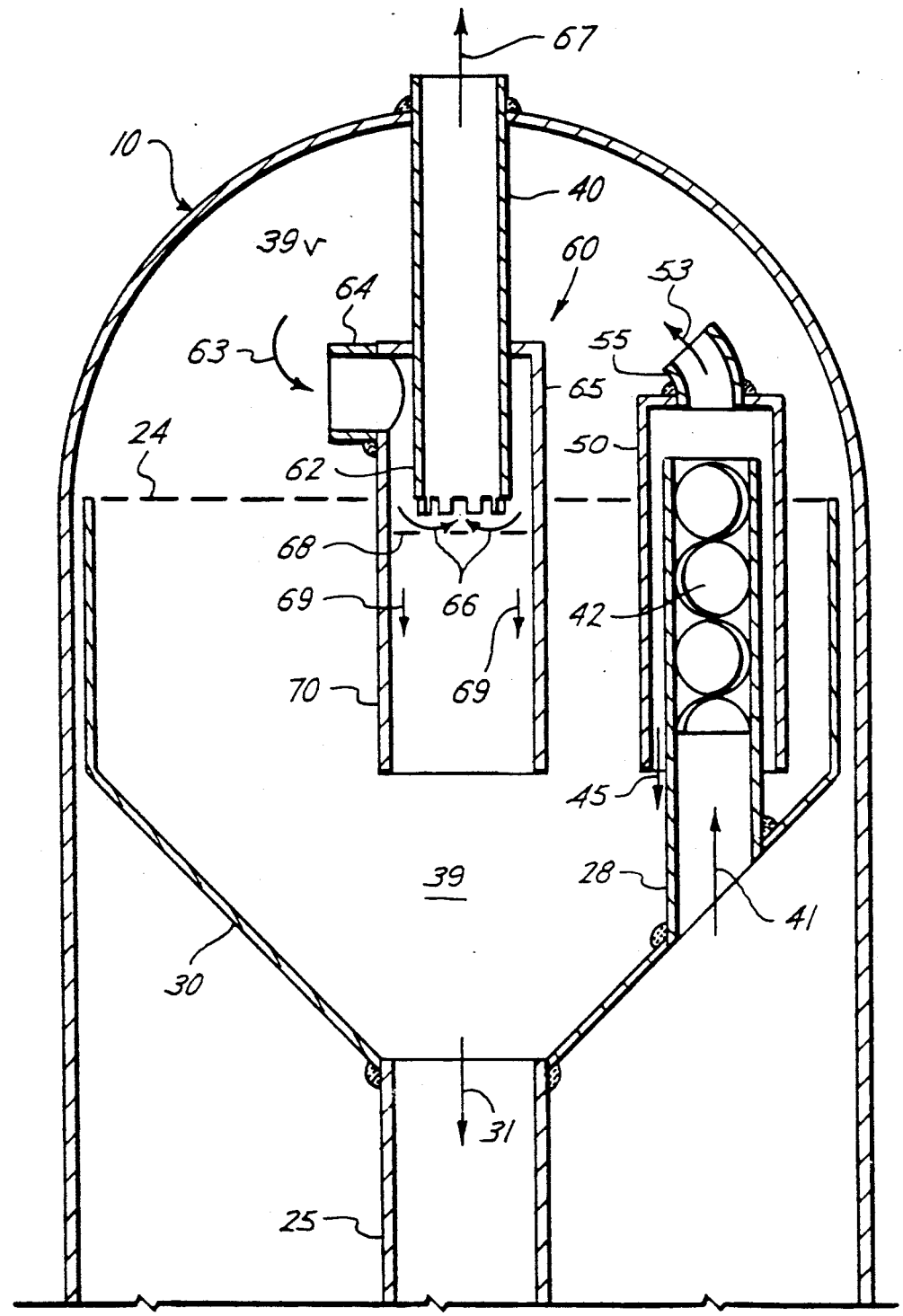
FIG. 2 is a sectional view of a liquid degasser in the reaction vessel of an ebullated bed process.

Reference is made to FIG. 2. FIG. 2 is a cross-sectional view of the FIG. 1 configuration of recycle cup 30 and reactor outlet conduit 40 in greater detail. Gas-entrained liquid 41 moves upwardly into riser conduit 28 where it contacts helical tangential velocity inducing member 42. In this representation, helical member 42 comprises three and a half 360° turns at 40° from the vertical spiral. Helical member 42 imparts a tangential velocity component to the gas-entrained liquid 41 and directs it tangentially toward cyclone separator 50. The proportions of cyclone separators is taught in Perry's Chemical Engineers' Handbook 4th Ed., p 20-69 Cyclone separator 50 effects a vapor-liquid separation. Separated vapor 53 is directed through conduit 55 to a relatively vapor rich zone such as a vapor zone 39v if a vapor-liquid interface 24 exists within reactor 10. Separated liquid 45 flows downward along the surface toward phase separation zone 39.

The lower portion of reactor outlet conduit 40 is attached to and in direct fluid communication with the gas outlet conduit 62 of cyclone separator 60.

Vapor and liquid, including separated vapor 53, from vapor zone 39v enters cyclone inlet conduit 64 in the direction of arrow 63. The vapor having entered the cyclone spins cyclonically, contained between the outer surface of gas outlet conduit 62 and the inner surface of barrel 65. Cyclonic spinning causes a separation of vapor and liquid, with the more dense liquid forced toward barrel 65 and less dense gas forced toward gas outlet conduit 62. The separating vapor and liquid flow downward until the gas reaches and enters the lower end of gas outlet conduit 62 in the direction of arrow 66 and flows out of reactor 10 in the direction of arrow 67.

The liquid reaches liquid surface 68 and continues flowing downward in the direction of arrow 69 in liquid outlet conduit 70. This liquid becomes a portion of the liquid contained in recycle cup 30.

The liquid in recycle cup 30 may contain an amount of gas. This liquid therefore is made to remain in phase separation zone 39 for a residence time determined by the contained volume of recycle cup 30 and the flow rates of reactants into and products out of reactor 10.

There are three dispositions for liquid in recycle cup 30. The first is to flow down recycle conduit 25 to ebullate the catalyst bed as previously described. The second disposition is a vapor-liquid separation in the recycle cup 30 caused by cyclonic spinning in the recycle cup and by residence time. The separated vapor flows to interface 24, into vapor space 39v, through inlet 64 and reactor outlet conduit 40 out of the reactor.

The third disposition is rare, occurring only when vapor-liquid separation is not effective. If a less than adequate separation is made in the reactor, vapor phase 39 is so reduced that it cannot satisfy the material balance requirements of the reactor. Accordingly, liquid and foamy liquid (unseparated liquid and vapor) are removed via reactor outlet conduit 40. As taught by U.S. Pat. No. 4,971,678 in an ebullated bed process vapor is removed preferential to removing liquid from the ebullated bed reactor 10. As long as a vapor phase 39 exits in the reactor it is preferred that all vapor be removed from the reactor before any liquid is removed.

Liquid outlet conduit 70 is sealed with liquid in recycle cup 30 by liquid level 68. When required to maintain material balance, liquid level 68 moves upward. As seen in FIG. 2, if the liquid level moves up sufficiently, liquid enter gas outlet conduit 62 and flows through reactor outlet conduit 40 and out of reactor 10.

This third disposition is least preferred. This disposition is the result of inadequate liquid-vapor separation. This is evident from the foamy, gas filled liquid flowing from reactor 10. The two stage cyclone separator of the invention effects the liquid-vapor separation which makes available vapor for removal from the reactor, separate from liquid or foamy liquid.

SUMMARY OF THE INVENTION

The invention is a liquid degasser in combination with a high pressure reaction vessel adapted for reacting fluid hydrocarbon feedstocks with a hydrogen-containing gas at elevated temperatures and pressures in the presence of a bed of particulate solid catalyst, the process referred to in the art as an ebullated bed process. In the ebullated bed process, hydrogen containing gas and feedstock are introduced into the lower end of a generally vertical catalyst containing vessel. They are introduced at sufficient velocity to force the catalyst into random motion and to expand the volume of the catalyst bed to greater than the static volume. The mixture of feedstock, gas and catalyst constitutes a catalytic reaction zone wherein minimum catalyst settling takes place. The upper portion of the catalytic reaction zone is defined by a catalyst depleted zone substantially free of catalyst. A generally vertical recycle conduit is positioned at the top of the catalyst depleted zone. The upper end of the recycle conduit is in fluid communication with a phase separation zone in the upper portion of the reaction vessel. Extending through the enlarged upper end of the recycle conduit are a plurality of generally vertical riser conduits of essentially uniform cross-sectional area. The lower ends of the riser conduits are in fluid communication with the catalyst depleted zone below the enlarged upper end of the recycle conduit. The upper ends of the riser conduits are in fluid communication with the phase separation zone above the enlarged upper end of the recycle conduit by way of first cyclone separators. The riser conduits are adapted for the flow of fluid therethrough. The lower end of the recycle conduit is in fluid communication with a recycle pump. Liquid is recycled from the solids free zone to the lower end of the catalytic reaction zone by means of the recycle pump. Catalytically reacted hydrocarbon and gas are removed from the upper portion of the vessel. At the upper end of the reaction vessel is an exit conduit for the removal of gas and vapor from the reaction vessel. A second cyclone separator is in direct fluid communication with the reaction vessel exit conduit. This second cyclone separator has an inlet duct in fluid communication with first cyclone separators. The second cyclone liquid outlet is sealed with liquid in the recycle cup comprising a portion of the phase separation zone liquid.

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. A liquid degasser in combination with a high pressure reaction vessel having an upper end and a lower portion,
   A. said lower portion adapted for the reaction of a fluid hydrocarbon feed with a hydrogen rich gas at elevated temperatures and pressures in the presence of a bed of solid particulate catalyst, said reaction being the type wherein the gas and hydrocarbon feed are passed upwardly through the bed at velocities whereby the bed is expanded to a volume greater than its static volume and the catalyst is put in a state of random motion and wherein the mixture of hydrocarbon feed, gas and catalyst constitute a catalytic reaction zone wherein minimum catalyst settling takes place, the upper portion of which is defined by a catalyst depleted zone.
   B. said reaction vessel upper end having an exit conduit adapted for the removal of products of said reaction,
   said liquid degasser comprising:
   1. a generally vertical recycle conduit having an enlarged upper end in fluid communication with a phase separation zone and a lower end in fluid communication with means for recycling liquid from the catalyst depleted zone to the catalytic reaction zone and a plurality of riser conduits adapted for fluid flow therethrough extending through the enlarged upper end, each riser conduit having a lower ends in fluid communication with said catalyst depleted zone and upper ends in fluid communication with first cyclone separators, said first cyclone separators comprising vapor discharge conduits, and
   2. a second cyclone separator having a gas outlet conduit in fluid communication with said reaction vessel exit conduit, and an inlet duct in fluid communication with said first cyclone separator discharge conduits.

2. The liquid degasser of claim 1 comprising a single reaction vessel exit conduit and a single second cyclone separator.

3. The liquid degasser of claim 1 wherein the second cyclone separator additionally comprises a liquid outlet conduit in fluid communication with said phase separation zone.

4. The liquid degasser of claim 1 wherein the second cyclone separator additionally comprises a liquid outlet conduit containing a liquid seal.

5. The liquid degasser of claim 1 wherein helical, tangential velocity inducing members are positioned in the riser conduits.

* * * * *